United States Patent [19]

Elliott et al.

[11] 4,050,890

[45] Sept. 27, 1977

[54] HOT MELT DISPENSER BODY

[75] Inventors: Richard Montgomery Elliott; Albert Eugene Newton, both of Beverly, Mass.

[73] Assignee: USM Corporation, Boston, Mass.

[21] Appl. No.: 676,220

[22] Filed: Apr. 12, 1976

[51] Int. Cl.² .......................... F27B 5/00; F27B 17/00
[52] U.S. Cl. .............................. 432/210; 126/343.5 A; 222/146 HE; 432/211; 432/212
[58] Field of Search ............... 432/210, 211, 212, 213; 222/146 H, 146 HE; 126/343.5 A

[56] References Cited

U.S. PATENT DOCUMENTS

| 3,144,864 | 8/1964 | Heijnis | 126/343.5 A |
| 3,298,572 | 1/1967 | Newton | 222/146 HE |
| 3,314,573 | 4/1967 | Newton | 222/146 HE |
| 3,721,226 | 3/1973 | Childree et al. | 126/343.5 A |

*Primary Examiner*—John J. Camby
*Attorney, Agent, or Firm*—Carl E. Johnson; Richard B. Megley; Vincent A. White

[57] ABSTRACT

A hot melt body for an applicator or dispenser of thermoplastic adhesive first received in solid form, either as a progressively fed rod or in another mode, is provided having especial advantage in a light-weight hand-type device. The main melt chamber and its auxiliary channels as well as their interconnecting passageways are of configuration and spacing to effect maximum efficiency in transfering melting heat from a heating means to the adhesive being liquefied. To this end, also, complemental portions of the body include passageways designed to provide minimum, substantially uniform resistance to advance of the solid adhesive along the length of the melt body.

7 Claims, 14 Drawing Figures

HOT MELT DISPENSER BODY

CROSS REFERENCE TO RELATED APPLICATION

An application Ser. No. 639,074 was filed Dec. 9, 1975, now U.S. Pat. No. 4,014,460, in the names of Richard Elliott et al pertaining to a hot melt dispenser body and the method of making it. That application is assigned together with the present application to a common assignee.

BACKGROUND OF THE INVENTION

This invention relates to thermoplastic applicators, and especially to hand-held, adhesive rod-fed guns.

In the application just referred to, a melt body comprises a generally conic main melt chamber having an outlet at its smaller end, at least one manifold by-pass generally parallel to the chamber, and holes spaced along the chamber to bleed off material as melted to the by-pass. Another melt body designed for an adhesive extruder is disclosed in U.S. Pat. No. 3,776,426 issued in the name of Albert Newton, the construction there being such that transverse collecting grooves at spaced intervals enable liquefied material to exit from the melt chamber and through a manifold to a discharge end. Numerous other devices have hitherto been provided for applying hot melt, a recently disclosed gun being shown, for example, in U.S. Pat. No. 3,877,610.

When the adhesive melting and feeding means is to be manually wielded with deftness it is important that, even through extended periods of "on-and-off" use, the heft of the manually manipulated tool not become burdensome. Rod-feed adhesive supplying mechanisms with a control therefor are generally found advantageous and convenient, but because of their weight, their incorporation in hand guns dictates that special consideration be given to attaining the lowest melt body weight consistent with adequate flow capacity and highly efficient heat transfer for effecting progressive melting of the rod as it is advanced to the point of application.

SUMMARY OF THE INVENTION

In view of the foregoing, it is an object of this invention to provide, especially for use in hand-held thermoplastic applicators employing rod or other solid material feed mechanism, a compact, light-weight melt body exhibiting high melting efficiency and near-minimum resistance to advance of the material through the body.

Another object of the invention is to provide, in an industrial cement extruder of the type employing mechanized adhesive rod feeding means operable on demand of the operator, an improved melt body for delivering molten effluence in high volume for its size and with little if any back-flow influence on the feeding means.

To these ends, and as herein shown, an illustrative hot melt body, preferably comprised of two complemental portions each incorporating a heating means, includes a longitudinal melt chamber having walls advantageously tapering to circumferentially "squeeze" and/or closely engage a cement rod as it is heated without adversely inhibiting its advance. Preferably the chamber has successive transverse cross sectional shapes diminishing in size in at least one dimension from a substantially cylindrical inlet passageway, opposite walls longitudinally defining the melt chamber being substantially straight and of non-diminishing dimension at right angles to the one dimension referred to above. A further feature of the invention resides in the mentioned opposite walls in one complemental body portion having faces parallel to but slightly spaced from the confronting corresponding faces of walls in the other complemental body portion thereby providing clearance for the hot melt to be continuously relieved in molten form into manifolds discharging into the outlet end of the body. Another novel aspect of the invention relates to the provision in the cited melt channel walls, at spaced intervals therealong, of openings defined by angular edge wiping formations adapted to "peel off" opposed softened or semi-molten layers of the core of the progressively softening rod material, the arrangement importantly being such that this "peeling" occurs at increasing depth along the rod core as the latter diminishes in cross section thereby ensuring no localized build-up of resistance to the force effecting the rod feeding. The wall openings alluded to desirably direct the melted and/or semi-molten adhesive into bypass passageways leading in the feeding direction to their aforementioned manifolds, a series of angular, substantially parallel lands integral with the complemental body portions, respectively, and defining these passageways, additionally serving to transfer heat and facilitate outflow to an exit nozzle. Advantageously pressure at the mentioned wall openings derived from the advancing rod feed is greater than in outer portions of the bypasses so that the molten adhesive escaping through the mentioned longitudinal clearance is also carried effectively into the manifolds from between the lands.

BRIEF DESCRIPTION OF THE DRAWINGS

The foregoing and other features of the invention will now be more particularly described in connection with an illustrative embodiment, and with reference to the accompanying drawings thereof, in which.

Figure 8:
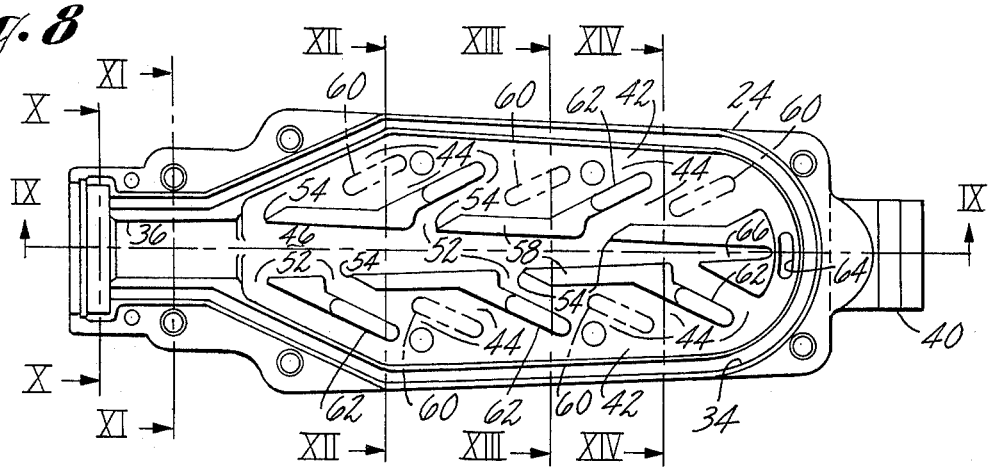
FIG. 8 is a plan view of one of the two melt body portions, with angular, staggered lands of the one portion defining with similar lands (shown by dash lines) from other body portion both scraping edges and passageways facilitating continuous flow to manifolds leading to the outlet nozzle.

IX—IX of FIG. 8, and FIGS. 10–14, respectively, are transverse sections taken on the lines X—X, XI—XI, XII—XII, XIII—XIII, and XIV—XIV of FIG. 8, and substantially corresponding to FIGS. 4–7.

DESCRIPTION OF THE PREFERRED EMBODIMENT

Figure 1:
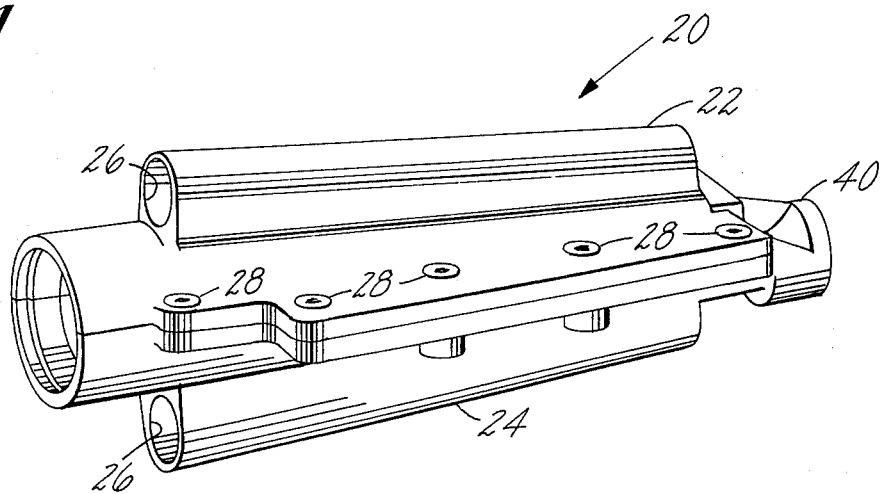
FIG. 1 is a perspective view of our hot melt body having its two complemental portions assembled for mounting in an applicator, the inlet or larger end being adapted to receive thermoplastic rod cement to be dispensed as a fluid from the opposite end.
Figure 2:
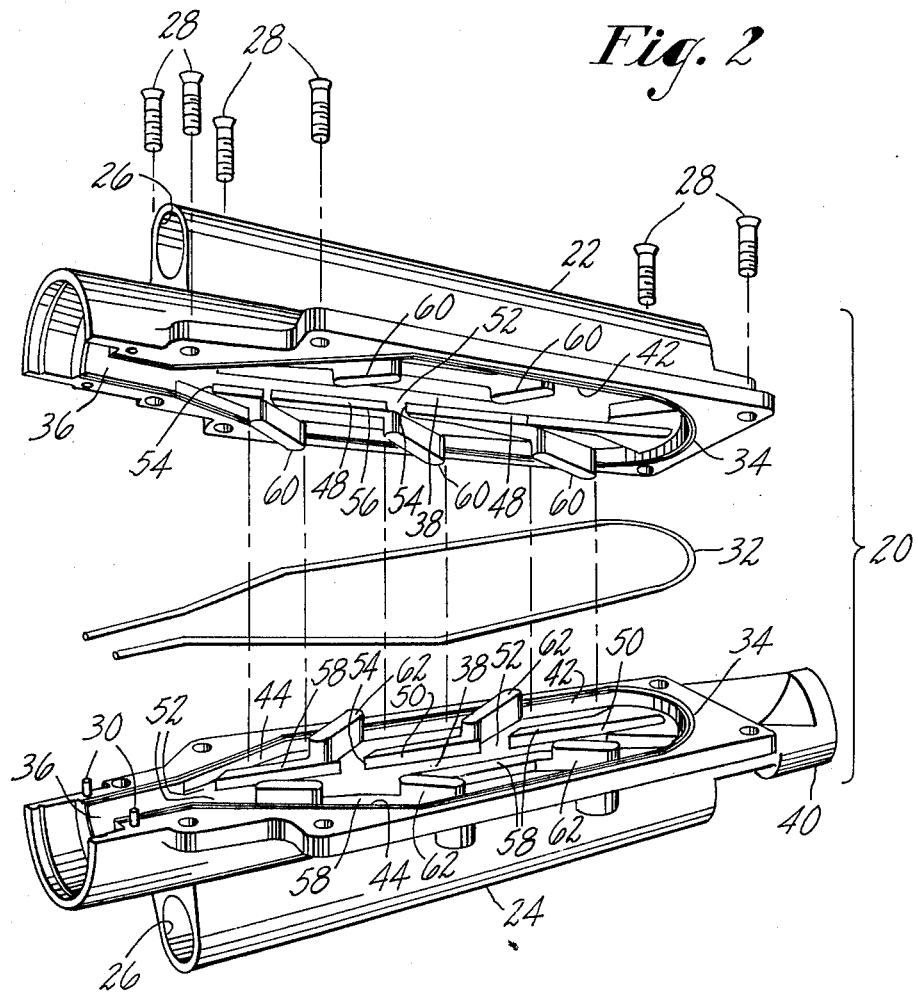
FIG. 2 is an exploded perspective view of the body portions shown in FIG. 1 together with a sealing ring and associated fastener means.
Figure 3:
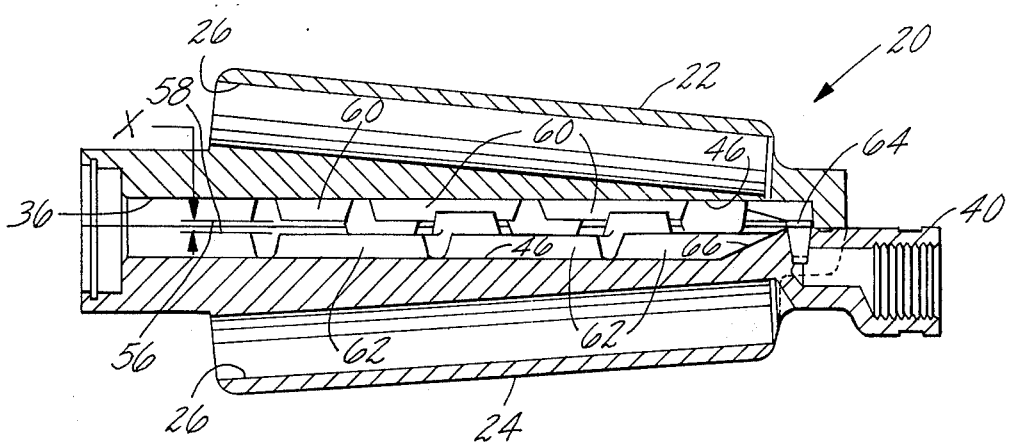
FIG. 3 is an axial section showing the longitudinal clearance between internal walls defining a main melt chamber extending between an inlet end for receiving a flexible rod of thermoplastic and an outlet nozzle end.
Figure 4:
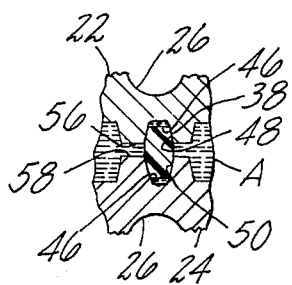
FIGS. 4–7 inclusive are transverse sections showing, at longitudinally spaced localities, the successively diminishing size and shape of the core of an adhesive rod being fed, confined, and reduced in the main melt chamber of the body.
Figure 5:
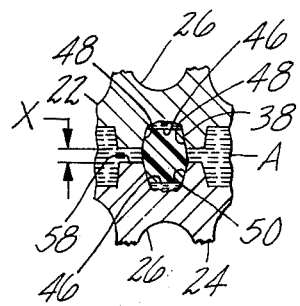
Figure 6:
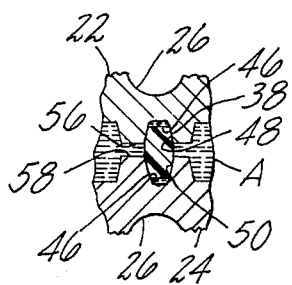
Figure 7:
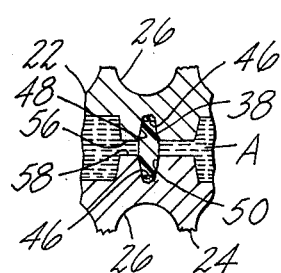

A main melt body generally designated 20 in FIGS. 1-3 of metal, for instance aluminum comprises complemental portions 22,24 each of which may include, in oppositely disposed relation, a cylindrical cavity 26 for accommodating a heating element (not shown). The portions 22,24 are desirably secured in assembled relation shown in FIG. 1 by suitable fastener means 28 and locating pins 30,30. A U-shaped sealing gasket or ring 32 (FIG. 2) is nested in complemental grooves 34,34 to ensure against leakage of thermoplastic adhesive or "hot melt" designated A in FIGS. 4–7.

The thermoplastic A to be melted is introduced into the mouth or larger end of the body 20 preferably endwise progressively in the form of a continuous flexible rod which may be of generally uniform cross section, usually circular or formed with an undulating perimeter roughly circular. Accordingly a manual feeding or, more desirably for industrial applications, a suitable mechanical means (not shown) is operable at the will of an operator to advance solid adhesive A into a cylindrical inlet portion 36 of an axial main melt chamber 38, the inlet being only slightly larger in diameter than the rod A. It will be understood that the circumferential skin of the rod A is to be progressively melted by conducted heat as the transversely diminishing unmelted core of the rod advances toward complete liquidity at an outlet end 40 in the portion 24 and usually internally threaded to receive a suitable applicator nozzle for applying the molten adhesive A. In general, further details of internal construction next to be described are designed with three primary objectives in view: (1) to facilitate efficient reduction to molten state of the adhesive, (2) to avoid undue friction with the advancing adhesive solid core except as desirable, to a uniform degree along the melt chamber, for scraping or peeling off circumferential semi-molten material, and this to be accomplished at increasing depths over smaller circumferential portions of the rod core, and (3) to ensure easy bleeding-off and outflow of the adhesive as soon as liquefied and separable from the rod core to an exit manifold passageway 42 via a plurality of angular bypasses 44 interconnecting it, as will be explained, to the main melt chamber 38.

The main melt chamber 38, somewhat similar opposite halves of which are shown in FIG. 2, is defined by parallel, opposed, smooth, transversely, tapering outer surfaces 46 (FIGS. 5–8) which are substantially coterminous with and adjacent to the heater cavities 26,26 respectively. The chamber 38 is further defined by opposite side walls 48,48 and 50,50 interrupted along their length at staggered localities by openings 52 leading into the respective bypasses 44. As noted in FIGS. 5–7, the opposite side walls 48,48 and 50,50 of the main melt chamber halves provided by the respective portions 24,26 come closer together as the outlet end 40 is approached thus to enable leading acute edges 54 of the several segments of the side walls 48 and 50 to wipe or "peel-off" external softened semi-fluid layers from the core of the adhesive rod which will have become progressively modified from circular periphery.

It is further important to note in FIG. 3 and FIGS. 5–7 that inner faces 56 of the side walls 48 are parallel spaced from confronting faces 58 of the walls 50 thus to provide an elongated longitudinal clearance (indicated by dimension X in FIG. 3) permitting continuous lateral effusion of molten thermoplastic A into the above-mentioned bypass channels 44. (The dimension X may be on the order of about one-sixteenth inch). As indicated in FIG. 8, the openings 52 enable the melted and semi-molten circumferential material A diverted by the "scraping" side wall edges 54 from the central rod core also to pass into the adjacent bypass channels 44. The arrangement is such that each bypass inlet or opening 52 deflects semi-molten or liquefied adhesive A into intimate contact with one of a pair of series of interposed land 60 or 62 integral with its body portion 22 or 24, respectively. The lands 60,62 are heat transfer fins substantially parallel, staggered and angularly disposed with respect to the direction of rod feed in the main melt chamber 38 so as to provide conduits, one for each opening 52, affording very little resistance to the direction of flow of molten thermoplastic into the outer manifold passageways 42.

Figure 9:
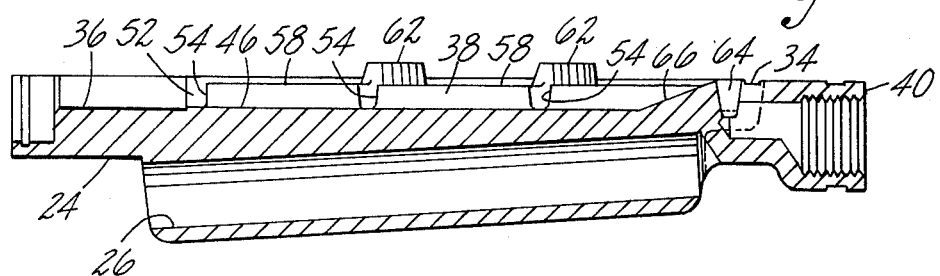
FIG. 9 is a longitudinal section taken on the line.
Figure 10:
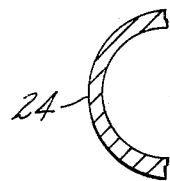
Figure 11:
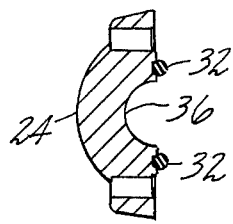
Figure 12:
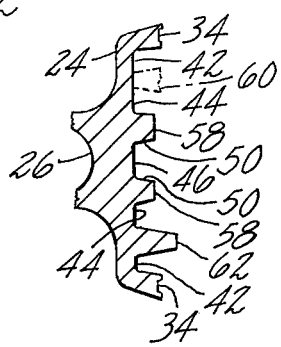
Figure 13:
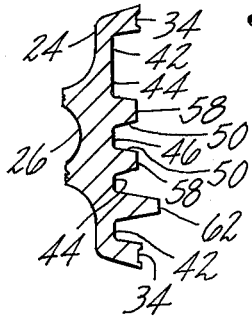
Figure 14:
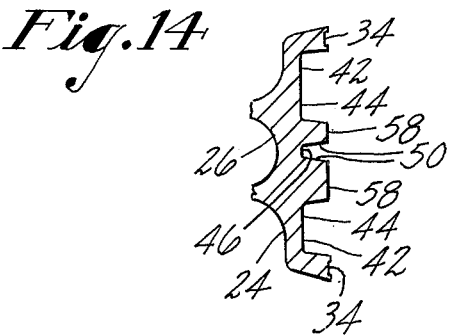

Adjacent to the outlet end 40, the manifold passageways 42 in the portions 22,24 arcuately merge at a port 64 (FIGS. 3,8,9) leading to the outlet 40. It will be understood that heat transfer in the course of the passage of the solid rod A in the melt body 20 is normally adequate to have eliminated all stiffness in the rod A and to fully render the adhesive completely molten when its leading core end approaches the port 64. Better to ensure this, an end portion 66 (FIG. 9) of the melt chamber surface 46 in the body portion 24 is inclined upwardly toward the body axis to provide restriction of the chamber 38 yet entirely avoid, so far as practicable, the possibility of the channel becoming clogged and any back-flow of the molten ahesive via the inlet 36.

For simplicity in construction each of the body portions 22,24 preferably has its outer tapering channel surface 46 coplanar with radial wall portions of the passageways 42,44, the common planar surfaces being substantially parallel.

Briefly to review operation of the melt body 20, the leading end of the rod A will be fed endwise progressively through the inlet 36 by feed mechanism not herein shown. Assuming electrical or other heating means in the cavities 26 to be functioning, peripheral portions of the advancing rod are increasingly melted by actual contact with the heated walls 48,50 of the melt chamber thereby becoming transversely reduced in one dimension (horizontal as shown in FIGS. 4–7) but substantially maintaining its dimension in another direction i.e. heightwise in the figures referred to and between outer surfaces 46,46. The melted thermoplastic itself is customarily a poor heat conductor. Some surface melt from the rod A and adjacent to the surfaces 46 is normally serving as a lubricant, or at least not providing significant resistance to advance of the rod; other surfaces melt along opposed, longer sides of the rod and contacting the walls 48,48 and 50,50 aids in "floating" advance of the solid rod and continuously is being allowed to flow through the longitudinal clearance between the faces 58,58 and into the bypass channels 44.

Hot melt A and, to some extent perhaps softened rod material A, exiting from the main melt chamber 38 through the longitudinally staggered openings 52, having been "peeled off" at the edges 54, by reason of the feeding force being transmitted to advance the core of the rod, passes between a pair of the lands 60,62. The pressure thus provided in the openings 52 exerts a pushing influence on the hot melt escaping from between the faces 58,58 and continuously aids in filling the channels 44 and maintaining discharge therefrom into the manifold passageways 42. The latter share in the heat transfer by conductivity from the heaters in the cavities 26. As herein shown the body 20 preferably tapers, the channels 44 and their lands 60,62 becoming shorter toward the outlet end 40.

The configuration accordingly is such as to fully accommodate flow of the adhesive up to the maximum expectable melt rate, and allows for the lesser rate of flow to be derived nearer the outlet 40 due to the diminishing circumference of the core of the rod A. It will be appreciated that, as with most such melting devices, an initial "warm-up" or preliminary heating period is desirable prior to actuating the mechanism for feeding the rod to be melted. Advantageously, the melt body in normal operation will thus seldom have air pockets, its internal passageways, being constantly filled with adhesive that is being efficiently maintained in its heated fluid state for ready application. Importantly, the low resistance met with in the melt body 20 to the advance of the thermoplastic, both solid and fluid, enables the rod feed to be suitably accomplished by a smaller and hence lighter weight motor means, thereby greatly improving the utility and convenience of the applicator in which the body is employed.

Having thus described our invention what we claim as new and desire to secure by Letters Patent of the United States is:

1. A hot melt body for an applicator of thermoplastic material to be advanced from an inlet to an outlet end and progressively reduced from solid to fluid as the material is thus fed, the body comprising elongated complemental portions defining a longitudinal main melt chamber extending between the inlet and outlet end and having progressively diminishing cross sections toward the outlet end shaped to constrain the material while at least partly solid to rectilinear movement and characterized by opposite side walls and at least one continuous flatted wall engageable throughout its length with the thermoplastic, complemental outer manifold passageways formed in the the respective body portions and leading to said outlet end, and a series of complemental bypass passageways formed in the respective body portions and interconnecting the main melt chamber at localities spaced therealong with the manifold passageways, said localities being disposed where solid thermoplastic material in said chamber is being rendered molten and semi-fluid, means in the body coextensive with said passageways for heating the walls of the main melt chamber and of the manifold and bypass passageways, said bypass passageways being generally angularly biased divergently relative to the side walls of said chamber in the direction of the feeding of said material in the main melt chamber.

2. A melt body as in claim 1 wherein the bypass passageways are provided by a series of generally parallel lands interdigitally disposed on opposite sides of the main melt chamber, the chamber having spaced, longitudinally staggered openings to said bypass passageways and said openings being defined in part by channel walls normal to the chamber.

3. A melt body as in claim 1 wherein the melt chamber is defined by a diametrically opposed pair of continuous flat walls diminishing progressively in width toward the outlet end.

4. A melt body as in claim 1 wherein the main melt chamber is circumferentially bounded by a wall having at least one longitudinal opening extending substantially coterminously with the chamber for permitting lateral effusion of molten thermoplastic therefrom into said bypass passageways.

5. A melt body as in claim 1 wherein the main melt chamber is defined by substantially complemental, U-shaped longitudinally tapering channels formed in the respective complemental body portions, opposite side, top and bottom walls of the chamber being substantially flat and defining cross sectional areas of dimensions becoming transversely reduced in one direction but maintained substantially constant in another direction, and confronting faces of the opposite side walls being spaced apart to provide a pair of longitudinally extending openings for bleeding off molten thermoplastic from the portion thereof being advanced in the main melt chamber.

6. A melt body as in claim 2 wherein each of its complemental portions is constructed to accommodate a heating means adjacent to said chamber and convergent therewith toward said outlet end.

7. A melt body for a device adapted to have rod-like thermoplastic fed into an inlet end of the body, comprising means for heating the body, a longitudinal main melt chamber extending from the inlet end toward an outlet end of the body and having successive cross sections changing transversely from substantially circular to progressively narrowing, generally rectangular shape toward the outlet end, no dimension of said shape being substantially larger than a dimension of the solid core of the thermoplastic to confine the core of the thermoplastic to a straight line, opposite walls of said chamber substantially unchanging in depth being open along at least one longitudinal side thereof to permit effusion of the thermoplastic therefrom, a manifold passageway extending in the body adjacent to its outer wall and substantially from said inlet end to the outlet, and bypass passageways interconnecting said opposite walls of the chamber at spaced localities therealong with the manifold passageway, said bypass passageways being disposed angularly to the direction of rod feed and having inlets respectively defined by at least one acute edge disposed to peel-off semi-molten and molten material from the core of the thermoplastic as it is fed in said main melt chamber.

* * * * *